United States Patent
Chen et al.

(10) Patent No.: US 11,990,117 B2
(45) Date of Patent: May 21, 2024

(54) USING SPEECH RECOGNITION TO IMPROVE CROSS-LANGUAGE SPEECH SYNTHESIS

(71) Applicant: Google LLC, Mountain View, CA (US)

(72) Inventors: Zhehuai Chen, Jersey City, NJ (US); Bhuvana Ramabhadran, Mt. Kisco, NY (US); Andrew Rosenberg, Brooklyn, NY (US); Yu Zhang, Mountain View, CA (US); Pedro J. Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 134 days.

(21) Appl. No.: 17/451,613

(22) Filed: Oct. 20, 2021

(65) Prior Publication Data

US 2022/0122581 A1   Apr. 21, 2022

Related U.S. Application Data

(60) Provisional application No. 63/094,786, filed on Oct. 21, 2020.

(51) Int. Cl.
*G10L 13/047*      (2013.01)
*G10L 13/08*       (2013.01)
*G10L 13/10*       (2013.01)

(52) U.S. Cl.
CPC .......... *G10L 13/047* (2013.01); *G10L 13/086* (2013.01); *G10L 13/10* (2013.01)

(58) Field of Classification Search
None
See application file for complete search history.

(56) References Cited

U.S. PATENT DOCUMENTS

| 8,452,603 B1* | 5/2013 | Liu | G06F 9/454 |
|---|---|---|---|
| | | | 704/277 |
| 2009/0055162 A1* | 2/2009 | Qian | G10L 13/06 |
| | | | 704/8 |

(Continued)

FOREIGN PATENT DOCUMENTS

| CN | 110264991 A * | 9/2019 |
|---|---|---|
| WO | 2019139431 A1 | 7/2019 |

(Continued)

OTHER PUBLICATIONS

Zhang, Yu, et al. "Learning to speak fluently in a foreign language: Multilingual speech synthesis and cross-language voice cloning." arXiv preprint arXiv:1907.04448 (2019). (Year: 2019).*

(Continued)

*Primary Examiner* — Pierre Louis Desir
*Assistant Examiner* — Keisha Y. Castillo-Torres
(74) *Attorney, Agent, or Firm* — Honigman LLP; Brett A. Krueger; Grant Griffith

(57) ABSTRACT

A method for training a speech recognition model includes obtaining a multilingual text-to-speech (TTS) model. The method also includes generating a native synthesized speech representation for an input text sequence in a first language that is conditioned on speaker characteristics of a native speaker of the first language. The method also includes generating a cross-lingual synthesized speech representation for the input text sequence in the first language that is conditioned on speaker characteristics of a native speaker of a different second language. The method also includes generating a first speech recognition result for the native synthesized speech representation and a second speech recognition result for the cross-lingual synthesized speech representation. The method also includes determining a consistent loss term based on the first speech recognition result and the second speech recognition result and updating (Continued)

parameters of the speech recognition model based on the consistent loss term.

20 Claims, 8 Drawing Sheets

(56) References Cited

U.S. PATENT DOCUMENTS

| | | | | |
|---|---|---|---|---|
| 2014/0222415 | A1* | 8/2014 | Legat | G10L 13/08 |
| | | | | 704/8 |
| 2020/0082806 | A1* | 3/2020 | Kim | G06N 3/08 |
| 2020/0211528 | A1* | 7/2020 | Lee | G10L 15/16 |
| 2020/0327884 | A1* | 10/2020 | Bui | G06N 3/08 |
| 2020/0380952 | A1* | 12/2020 | Zhang | G10L 13/047 |
| 2021/0287656 | A1* | 9/2021 | Bonafonte | G10L 13/047 |
| 2022/0246136 | A1* | 8/2022 | Yang | G06N 3/044 |

FOREIGN PATENT DOCUMENTS

| | | |
|---|---|---|
| WO | 2020231522 A1 | 11/2020 |
| WO | 2021/225829 A1 | 11/2021 |

OTHER PUBLICATIONS

Japanese Patent Office. Office action relating to application No. JP 2023-524429, dated Nov. 27, 2023.
Wang, Gary et al., "Improving Speech Recognition Using Consistent Predictions on Synthesized Speech", Proc. of the IEEE ICASSP2020, Apr. 9, 2020, pp. 7029-7033.

* cited by examiner

USING SPEECH RECOGNITION TO IMPROVE CROSS-LANGUAGE SPEECH SYNTHESIS

CROSS REFERENCE TO RELATED APPLICATIONS

This U.S. patent application claims priority under 35 U.S.C. § 119(e) to U.S. Provisional Application 63/094,786, filed on Oct. 21, 2020. The disclosure of this prior application is considered part of the disclosure of this application and is hereby incorporated by reference in its entirety

TECHNICAL FIELD

This disclosure relates to using speech recognition to improve cross-language speech synthesis.

BACKGROUND

Automatic speech recognition (ASR) attempts to provide accurate transcriptions of what a person has said by taking an audio input and transcribing the audio input into text. Languages that are scarcely used today or have limited amount of spoken and textual resources present a challenge for training ASR systems because only a limited amount of labeled training data exists. Training ASR models with self-supervision may reduce the amount of labeled training data required to train ASR models. Often times, even where ASR models have sufficient labeled training data a unique ASR model is required for each language. Storing a separate ASR model for each language requires a significant amount of memory.

SUMMARY

One aspect of the disclosure provides a computer-implemented method that when executed on data processing hardware causes the data processing hardware to perform operations for training a speech recognition model. The operations include obtaining a multilingual text-to-speech (TTS) model. The operations also include generating, using the multilingual TTS model, a native synthesized speech representation for an input text sequence in a first language that is conditioned on speaker characteristics of a native speaker of the first language. The operations also include generating, using the speech recognition model, a first speech recognition result for the native synthesized speech representation and a second speech recognition result for the cross-lingual synthesized speech representation. The operations also include determining a consistent loss term based on the first speech recognition result and the second speech result and updating parameters of the speech recognition model based on the consistent loss term.

Implementations of the disclosure may include one or more of the following optional features. In some implementations, the operations further include generating a first cross-entropy loss term based on the first speech recognition result and the input text sequence in the first language, determining a second cross-entropy loss based on the second speech recognition result and the input text sequence in the first language, and updating parameters of the speech recognition model based on the first and second cross-entropy loss terms. In some examples, the parameters of the speech recognition model are updated based on the consistent loss term independently of the first and second cross-entropy loss terms. The operations may further include back-propagating the first and second cross-entropy losses through the multilingual TTS model. Optionally, the operations may further include applying data augmentation to at least one of the native synthesized speech representation or the cross-lingual synthesized speech representation.

In some implementations, the multilingual TTS model includes an encoder portion that shares language embeddings across the first and second languages and a decoder portion that shares the language embeddings across the first and second language and shares speaker embeddings for both native speakers of the first language and native speakers of the second language. In these implementations, a number of speaker embeddings for the native speakers of the first language may be less than a number of speaker embeddings for the native speakers of the second language. The decoder portion may be further conditioned on prosody information extracted from synthesized speech representations using a variational autoencoder. Here, the prosody information extracted from the synthesized speech representations using the variational autoencoder is disentangled from speaker information by applying an adversarial loss on speaker classification.

In some examples, prior to generating the native and cross-lingual synthesized speech representations, the operations further include: transliterating the input text sequence in the first language into a native script; tokenizing the native script into a phoneme sequence; encoding, using an encoder of the multilingual TTS model, the phoneme sequence; and decoding, using a decoder of the multilingual TTS model, the encoded phoneme sequence to generate the respective one of the native synthesized speech representation or the cross-lingual synthesized speech representation. In some implementations, the operations further include: generating, using a variational autoencoder, a native audio encoder embedding for the native synthesized speech representation; generating, using the variational autoencoder, a cross-lingual audio encoder embedding for the cross-lingual synthesized speech representation; determining an adversarial loss term conditioned on the first language based on the native and cross-lingual audio encoder embeddings; and updating parameters of the multilingual TTS model based on the adversarial loss term.

Another aspect of the disclosure provides a system for training a speech recognition model that includes data processing hardware and memory hardware storing instructions that when executed on the data processing hardware cause the data processing hardware to perform operations. The operations include obtaining a multilingual text-to-speech (TTS) model. The operations also include generating, using the multilingual TTS model, a native synthesized speech representation for an input text sequence in a first language that is conditioned on speaker characteristics of a native speaker of the first language. The operations also include generating, using the speech recognition model, a first speech recognition result for the native synthesized speech representation and a second speech recognition result for the cross-lingual synthesized speech representation. The operations also include determining a consistent loss term based on the first speech recognition result and the second speech result and updating parameters of the speech recognition model based on the consistent loss term.

Implementations of the disclosure may include one or more of the following optional features. In some implementations, the operations further include generating a first cross-entropy loss term based on the first speech recognition result and the input text sequence in the first language, determining a second cross-entropy loss based on the second speech recognition result and the input text sequence in the first language, and updating parameters of the speech recognition model based on the first and second cross-entropy loss terms. In some examples, the parameters of the speech recognition model are updated based on the consistent loss term independently of the first and second cross-entropy loss terms. The operations may further include back-propagating the first and second cross-entropy losses through the multilingual TTS model. Optionally, the operations may further include applying data augmentation to at least one of the native synthesized speech representation or the cross-lingual synthesized speech representation.

In some implementations, the multilingual TTS model includes an encoder portion that shares language embeddings across the first and second languages and a decoder portion that shares the language embeddings across the first and second language and shares speaker embeddings for both native speakers of the first language and native speakers of the second language. In these implementations, a number of speaker embeddings for the native speakers of the first language may be less than a number of speaker embeddings for the native speakers of the second language. The decoder portion may be further conditioned on prosody information extracted from synthesized speech representations using a variational autoencoder. Here, the prosody information extracted from the synthesized speech representations using the variational autoencoder is disentangled from speaker information by applying an adversarial loss on speaker classification.

In some examples, prior to generating the native and cross-lingual synthesized speech representations, the operations further include: transliterating the input text sequence in the first language into a native script; tokenizing the native script into a phoneme sequence; encoding, using an encoder of the multilingual TTS model, the phoneme sequence; and decoding, using a decoder of the multilingual TTS model, the encoded phoneme sequence to generate the respective one of the native synthesized speech representation or the cross-lingual synthesized speech representation. In some implementations, the operations further include: generating, using a variational autoencoder, a native audio encoder embedding for the native synthesized speech representation; generating, using the variational autoencoder, a cross-lingual audio encoder embedding for the cross-lingual synthesized speech representation; determining an adversarial loss term conditioned on the first language based on the native and cross-lingual audio encoder embeddings; and updating parameters of the multilingual TTS model based on the adversarial loss term.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
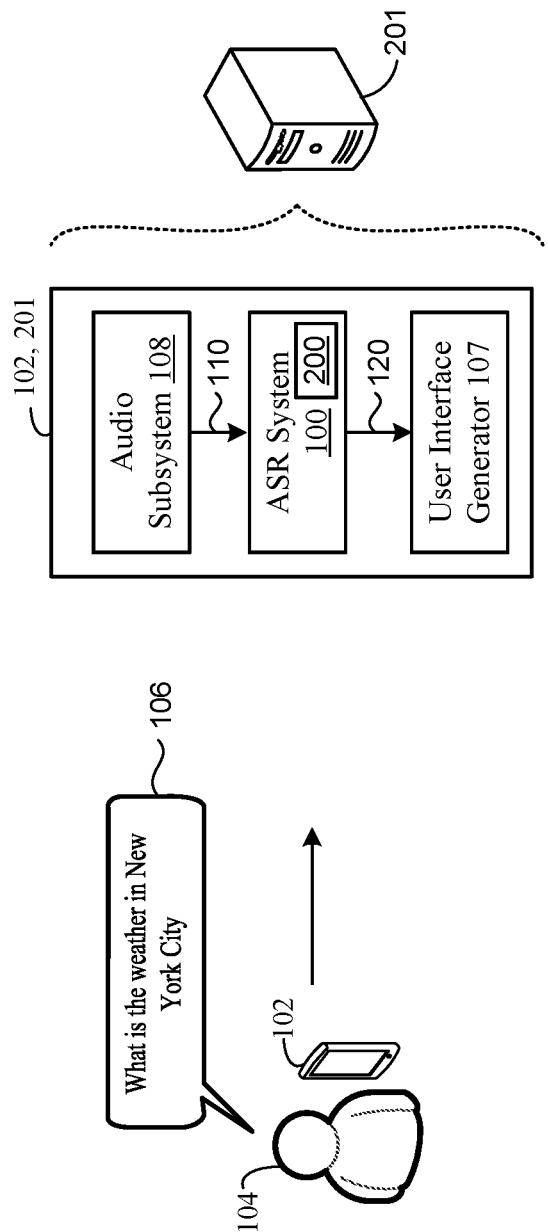
FIG. 1 is a schematic view of an example speech recognition system including a speech recognition model.

Vast amounts of transcribed data is needed to train automatic speech recognition (ASR) models. That is, ASR models require training data pairs that include audio data and corresponding transcriptions of the audio data. Together the audio data and corresponding transcription (e.g., training data pairs) train the ASR model. The ASR model receives the audio data, predicts a transcription of the audio data, and compares the predicted transcription to the corresponding transcription (i.e., ground truth label). The amount of training data pairs required to train ASR models, however, is difficult to collect. In some instances, user permissions are required to access training data pairs. In other instances, low resource languages only include a limited number of available speakers which creates little acoustic diversity to train ASR models that make only small improvements of the ASR models performance. For example, for low resource languages such as Indic languages (e.g., Kannada, Telugu, Tamil, and Bengali), only a limited number of speakers with formal, constrained speaking styles are available to train an Indic language ASR models. In contrast, for high resource languages such as English, there may be thousands of speakers with a variety of speaking styles are available to train English language ASR models.

Implementations herein are directed towards systems and methods of training an ASR model. In particular, for an input text sequence input to a multilingual TTS model, the TTS model generates a native synthesized speech representation in a first language. The native synthetized speech representation is conditioned on speaker characteristics of a native speaker of the first language. The TTS model also generates a cross-lingual synthesized speech representation in the first language for the same input text sequence. Here, the cross-lingual synthesized speech representation is conditioned on speaker characteristics of a native speaker of a second language. That is, the cross-lingual synthesized speech representation is condition on a non-native speaker of the first language. An ASR model receives the native and cross-lingual synthesized representations and generates a first speech recognition result for the native synthesized speech representation and a second speech recognition result for the cross-lingual synthesized speech representation. A consistent loss term module determines a consistent loss term based on a comparison of the first and second speech recognition results and the ASR model updates parameters based on the consistent loss term.

Implementations herein are further directed towards systems and methods of disentangling speaker embeddings, language embeddings, and prosody embeddings from synthesized speech representations produced by the multilingual TTS model for training the multilingual TTS model. A variational autoencoder (VAE) may receive the native and cross-lingual synthesized speech representations and generate a native audio encoder embedding and a cross-lingual audio encoder embeddings for the native and cross-lingual synthesized speech representations respectively. A classifier may then determine an adversarial loss term conditioned on the first language based on the native and cross-lingual audio encoder embeddings. The adversarial loss term may be used by the multilingual TTS model to update parameters to discourage generating accented synthesized speech representations. That is, the adversarial loss term discourages the synthesized speech representations from closely resembling on the speaker embeddings, language embeddings, and/or prosody embeddings of the speaker characteristics it conditions the synthesized speech representations on.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user 104 speaks a respective utterance 106 in a natural language of English for the phrase "What is the weather in New York City?" and the audio subsystem 108 coverts the utterance 106 into corresponding acoustic frames 110 for input to the ASR system 100. Thereafter, the ASR model 200 receives, as input, the acoustic frames 110 corresponding to the utterance 106, and generates/predicts, as output, a corresponding transcription (e.g., recognition result/hypothesis) 120 of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription 120 into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
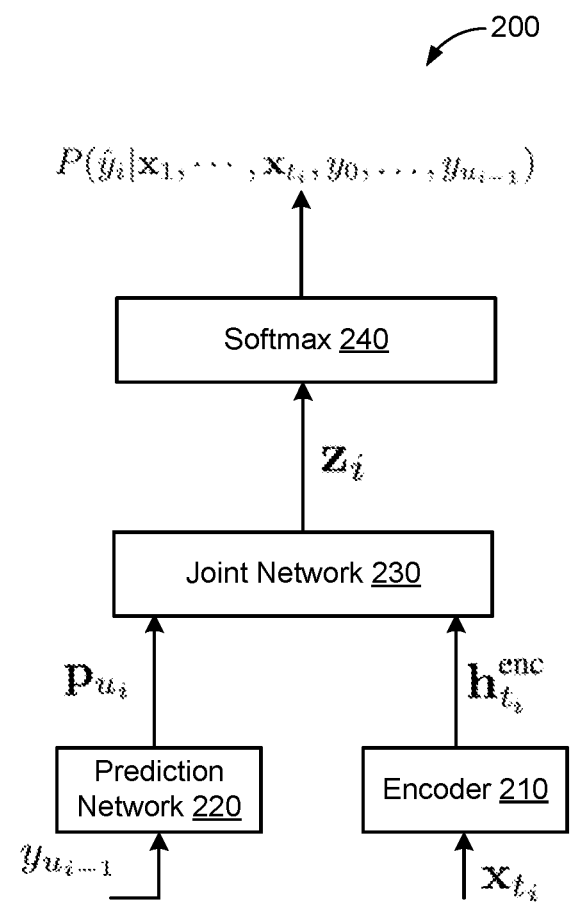
FIG. 2 is a schematic view of a Recurrent Neural Network-Transducer (RNN-T) model architecture.

Referring to FIG. 2, the ASR model 200 may include an end-to-end (E2E) sequence-to-sequence model. The E2E sequence-to-sequence model may include a Recurrent Neural Network-Transducer (RNN-T) model architecture which adheres to latency constraints associated with interactive applications. The RNN-T model 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a recurrent network of stacked Long Short-Term Memory (LSTM) layers. For instance the encoder reads a sequence of d-dimensional feature vectors (e.g., acoustic frames 110 (FIG. 1)) $x=(x_1, x_2, \ldots, x_T)$, where $x_t \in \mathbb{R}_d$, and produces at each time step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction networks 210, 220 are combined by the joint network 230. The joint network then predicts $(y_i|x_1, \ldots, x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model 200 to be employed in a streaming fashion.

In some examples, the encoder network 210 of the RNN-T model 200 is made up of eight 2,048-dimensional LSTM layers, each followed by a 640-dimensional projection layer. The prediction network 220 may have two 2,048-dimensional LSTM layers, each of which is also followed by 640-dimensional projection layer. Finally, the joint network 230 may also have 640 hidden units. The softmax layer 240 may be composed of a unified word piece or grapheme set that is generated using all unique word pieces or graphemes in a plurality of training text utterances.

Figure 3:
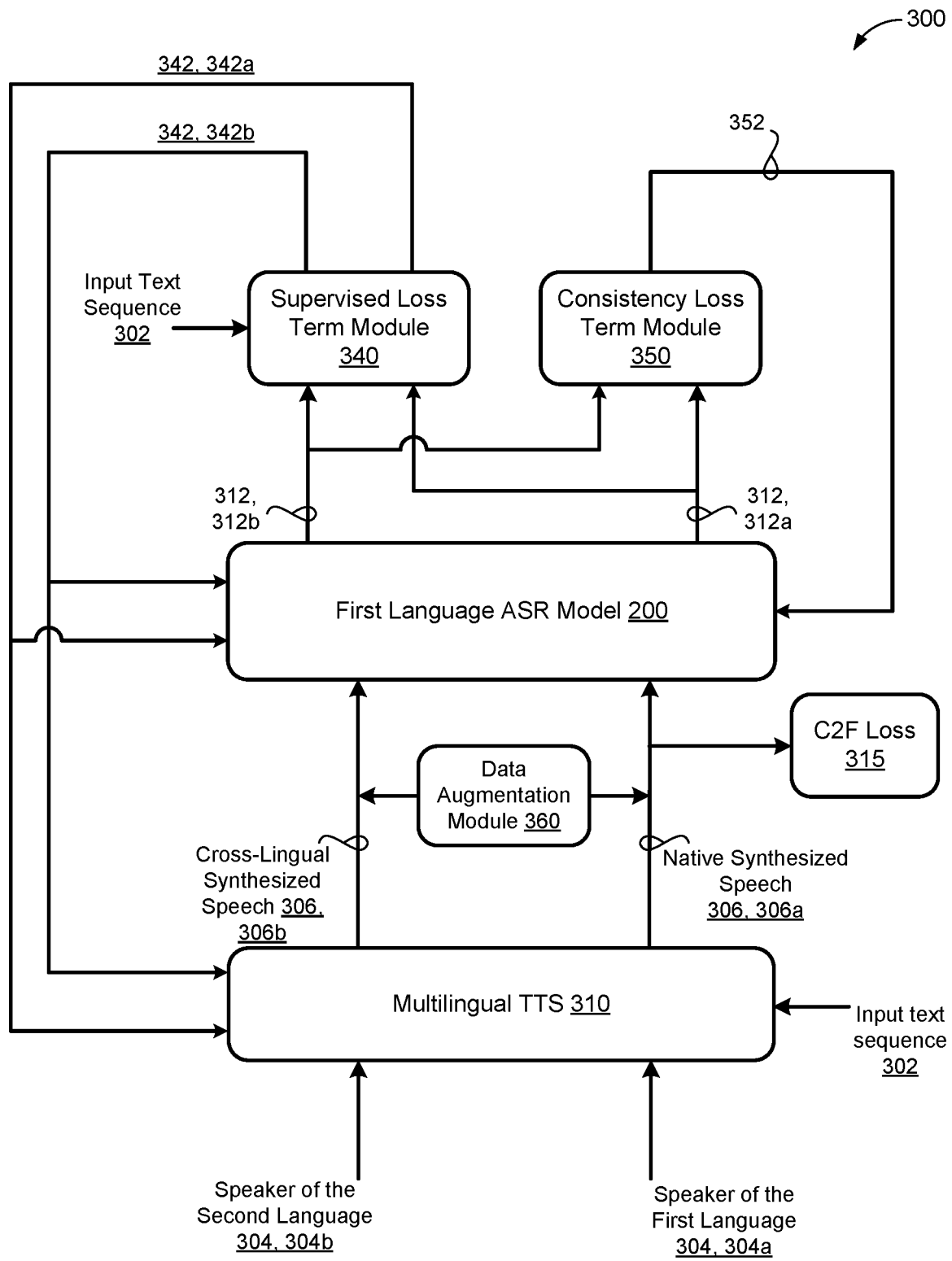
FIG. 3 is a schematic view of an example training process for training a speech recognition model and/or a multilingual text-to-speech model.

FIG. 3, illustrates an example training process 300 for training an ASR model 200 and/or a multilingual TTS model 310 (also referred to as TTS model 310). The TTS model 310 is configured to generate, at each of a plurality of time steps, synthesized speech representations 306 for each of a plurality of unspoken training text utterances 302 (also referred to as input text sequences 302). The input text sequences 302 include unspoken text that is text-only data, i.e., unpaired data, such that each input text sequence 302 is not paired with any synthesized speech non-synthesized speech representation, i.e., the input text sequence 302 is not paired with a corresponding utterance of human speech. Accordingly, the TTS model 310 generates a corresponding synthesized speech representation 306 for each of the input text sequences 302. That is, the TTS model 310 creates paired data via self-supervision by predicting synthesized speech representations 306 for the unpaired input text sequence 302. Notably, the synthesized speech representations 306 may include mel-frequency spectrogram frames for training the ASR model 200 thereby eliminating the need for the TTS model 310 to include a vocoder and/or synthesizer to synthesize the mel-frequency spectrogram frames into synthesized speech.

In some examples, the TTS model 310 generates multiple synthesized speech representations 306 for each of the input text sequences 302. Each of the synthesized speech representations 306 may be conditioned on speaker characteristics 304 of native speakers of different languages. In some examples, the speaker characteristics 304 for each native speaker of a respective language include a speaker embedding 305 (FIG. 6), a language embedding 303 (FIG. 6), and/or a local embedding 307 (FIG. 6) representing accent/dialect information, discussed in greater detail below with reference to FIG. 6.

In the example shown, the TTS model 310 receives an input text sequence 302 in a first language. For example, the input text sequence 302 may represent input text in a low resource language of Kannada (i.e., first language). Thereafter, the TTS model 310 generates a native synthesized speech representation 306, 306a for the input text sequence 302 in a first language that is conditioned on speaker characteristics 304, 304a of a native speaker of the first language. The speaker characteristics 304a of the native speaker of the first language may be referred to as a first conditioning input 304a. Continuing with the example, the TTS model 310 generates the native synthesized speech representation 306a in Kannada that is conditioned on speaker characteristics 304 of a native speaker of the Kannada language. Thus, the native synthesized speech representation 306a is conditioned on speaker characteristics 304a of a native speaker of the corresponding language of the input text sequence 302.

In some implementations, the training process 300 generates a coarse-to-fine (C2F) loss 315 by comparing the native synthesized speech representation 306a with ground truth audio of the native speaker of the first language for a corresponding input text sequence 302. Thus, the C2F loss 315 represents a difference between non-synthesized speech (e.g., ground truth audio) from the native speaker and the native synthesized speech representation 306a. The training process 300 provides the C2F loss 315 to the TTS model 310 and updates parameters of the TTS model 310 based on the C2F loss 315.

In some instances, however, the acoustic diversity of the native synthesized speech representations 306a is constrained because there are only a limited number of native speakers of the first language for certain low resource languages. Namely, Indic languages, such as Kannada, may only have speaker characteristics (e.g., conditioning inputs) 304 for one or two native speakers of Kannada that the TTS model 310 can condition synthesized speech representations 306 on. The constrained acoustic diversity of the synthesized speech representations 306 provides only incremental improvements when training ASR models. In contrast, high resource languages such as English have thousands of native speakers with a variety of speaking styles thereby providing significant improvements to the ASR models during training.

In some implementations, the TTS model 310 generates a cross-lingual synthesized speech representation 306, 306b for the same input text sequence 302 in the first language conditioned on speaker characteristics 304, 304b of a native speaker of a second language that is different from the first language. That is, the TTS model 310 generates the cross-lingual synthesized speech representation 306b for the input text sequence 302 in the first language that conveys the speaker characteristics 304b of the native speaker of the second language. The speaker characteristics 304b of the native speaker of the second language may be referred to as a second conditioning input 304a. For example, the TTS model 310 generates the cross-lingual synthesized speech representation 306b for the same input text sequence 302 in the Kannada language that is conditioned on speaker characteristics 304b of the native speaker of the English language. Put another way, the cross-lingual synthesized speech representation 306b represents Kannada speech spoken as a native speaker of the English language. Thus, the cross-lingual synthesized speech representation 306b is conditioned speaker characteristics 304b of a native speaker of a different language than the language of the input text sequence 302.

By conditioning the synthesized speech representations 306 on speaker characteristics of native speakers of different languages, the TTS model 310 can generate multiple synthesized speech representations 306 for each input text sequence 302 in the first language to increase acoustic diversity among the synthesized speech representations 306. That is, the TTS model 310 can utilize one or more speakers from a second language (e.g., English) to synthesize the input text sequence 302 in the first language (e.g., Kannada) even where the speakers of the second language do not speak the first language. Accordingly, the TTS model 310 can leverage high resource languages such as English to obtain speaker characteristics for native speakers of English to increase acoustic diversity among synthesized speech representations generated for low resource languages to train ASR models. Moreover, the TTS model 310 can generate synthesized speech representations 306 for unspoken input text sequences 302 thereby increasing the lexical diversity of training data for the ASR model 200.

In some implementations the training process 300 generates a spectrogram consistency loss (not shown). That is, the training process may extract latent variables from ground truth audio of the native speaker of the first language to perform teacher forcing on a cross-lingual synthesized speech representation 306b conditioned on speaker characteristics 304b of a native speaker of the second language.

Thereafter, for a corresponding input text sequence 302, the training process 300 calculates a mean squared error (MSE) between the cross-lingual synthesized speech representation 306b (e.g., based on the teacher forcing) and the ground truth audio of the native speaker of the first language to determine the spectrogram consistency loss. Accordingly, the spectrogram consistency loss promotes consistency between the cross-lingual synthesized speech representations 306b and the ground truth audio of the native speaker of the first language. The spectrogram consistency loss may be provided as feedback to the TTS model 310 to update parameters of the TTS model 310.

In the example shown, the TTS model 310 generates synthesized speech representations 306 conditioned on speaker characteristics 304a, 304b of only two speakers 304a, 304b for the sake of clarity only. That is, the TTS model 310 may generate any number of synthesized speech representations 306 conditioned on speaker characteristics 304 of any number of speakers. For example, the TTS model 310 can generate a third synthesized speech representation 306 in the Kannada language that is conditioned on speaker characteristics of a native speaker of a third language (e.g., native speaker of the Spanish language as spoken in Spain). Optionally, the TTS model 310 may generate a fourth synthetics speech representation 306 in the Kannada language conditioned on speaker characteristics of a second native speaker of the first language.

In some implementation, the training process 300 includes a data augmentation module 360 that applies data augmentation to at least one of the native synthesized speech representation 306a and/or the cross-lingual synthesized speech representation 306b. The data augmentation of the synthesized speech representations 306 is configured to further the acoustic diversity of the training samples used to train the ASR model 200. In some examples, the data augmentation module 360 applies data augmentation techniques that include at least one of adding/injecting noise, adding reverberation, or manipulating timing of the synthesized speech representations 306. Another data augmentation technique includes using multistyle training (MTR) to inject a variety of environmental noises to the synthesized speech representations. Yet another data augmentations technique that the data augmentation module 360 may apply in addition to, or in lieu of, MTR, includes using spectrum augmentation (SpecAugment) to make the acoustics of the synthesized speech representations closer. In combination, MTR and SpecAugment may inject noises into the synthesized speech representations 306, tile random external noise sources along time and inserted before and overlapped onto the representation, and filtering the noise-injective synthesized speech representation 306 prior to training the ASR model 200.

The example training process 300 trains the ASR model 200 using the multiple synthesized speech representations 306 generated by the multilingual TTS model 310. In the example shown, the ASR model 200 is trained to recognize speech spoken in the first language (e.g., Kannada language). For each synthesized speech representations 306 the ASR model 200 generates a corresponding speech recognition result 312. The speech recognition result 312 may represent a probability distribution over possible speech recognition hypotheses. The ASR model 200 generates a first speech recognition result 312, 312a for the native synthesized speech representation 306a and a second speech recognition result 312, 312b for the cross-lingual synthesized speech representation 306b. Continuing with the example above, the ASR model 200 receives the mel-frequency spectrogram frames for the native synthesized speech representation 306a conditioned on the first conditioning input 306a (e.g., the speaker characteristics 306a of the native speaker of the Kannada language) and generates the first speech recognition result 312a. The ASR model also receives the mel-frequency spectrogram frames for the cross-lingual synthesized speech representation 306b conditioned on the second conditioning input 304b (e.g., the speaker characteristic 304b of the native speaker of the English language) and generates the second speech recognition result 312b.

In some examples, the training process 300 determines a consistent loss term 352 based on the first and second speech recognition results 312a, 312b. For instance, the training process 300 may employ a consistent loss term module 350 configured to receive, at each of a plurality of time steps, the corresponding speech recognition results 312a, 312b output by the ASR model 200, and determine the consistency loss term 352 between the corresponding speech recognition results 312a, 312b at each of the plurality of time steps. The consistent loss term module 350 may determine the consistent loss term 352 based on a Kullback-Leibler divergence ($D_{KL}$) between a first probability distribution over possible first synthesized speech result hypotheses and a second probability distribution over possible second synthesized speech result hypotheses.

The consistent loss term 352 provides an "unsupervised" loss term that is independent of the accuracy of the ASR model 200 and may be employed to update parameters of the ASR model 200 for promoting consistency between the first speech recognition result 312a recognized from the native synthesized speech representation 306a and the second speech recognition result 312b recognized from the cross-lingual synthesized speech representation 306b. Notably, the synthesized speech representations 306a, 306b are generated from a same input text sequence 302 that serves as ground-truth for the ASR model 200. In other words, the consistent loss term 352 permits the ASR model 200 to learn to behave the same, e.g., make consistent predictions on both native synthesized speech representations 306a conditioned on the speaker characteristics 304a of the native speaker of the first language and cross-lingual synthesized speech representations 306b conditioned on the speaker characteristics 304b of the native speaker of the second language for the same input text sequence 302. During training, the consistency loss term module 350 may provide the consistent loss term 352 back to the ASR model 200 for updating the parameters of the ASR model 200 based on the consistent loss term 352.

In some implementations, the training process 300 executes a supervised loss term module 340 configured to receive, as input, the the speech recognition results 312 and generate, as output, supervised loss terms 342 based on the input text sequences 302 serving as ground-truth. In the example shown, the training supervised loss term module 340 receives the input text sequence 302 (i.e., ground truth transcription) and the first speech recognition result 312a and outputs a first supervised loss term 342, 342a (also referred to as a first cross-entropy loss term 342a). Thus, the first supervised loss term 342a is based on a comparison between the first speech recognition result 312a and the corresponding input text sequence 302 (e.g., target speech recognition result). The first supervised loss term 342a represents an accuracy of the first speech recognition result 312a based on the native synthesized speech representation 306a.

Moreover, the supervised loss term module 340 receives the input text sequence 302 and the second speech recognition result 312b and outputs a second supervised loss term 342, 342b (also referred to as a second cross-entropy loss term 342b). The second supervised loss term 342b is based on a comparison between the second speech recognition result 312b and the corresponding input text sequence 302 (e.g., target speech recognition result). Accordingly, the second supervised loss term represents an accuracy of the second speech recognition result 312b based on the cross-lingual synthesized speech representation 306b.

The supervised loss term module 340 may provide the first supervised loss term 342a and the second supervised loss term 342b back to the ASR model 200 and the ASR model 200 updates parameters based on the first supervised loss term 342a and the second supervised loss term 342b. In some examples, the training process 300 updates parameters of the ASR model 200 based on the consistent loss term 352 independently of the first supervised loss term 342a and the second supervised loss term 342b. Optionally, the training process 300 may back-propagate the first supervised loss term 342a and the second supervised loss term 342b to the TTS model 310 to update the parameters of the TTS model 310. Here, the ASR model 200 is fixed such that parameters of the ASR model 200 are static (e.g., not updated) while updating the parameters of the TTS model 310 based on the first and second supervised loss terms 342a, 342b.

Figure 4:
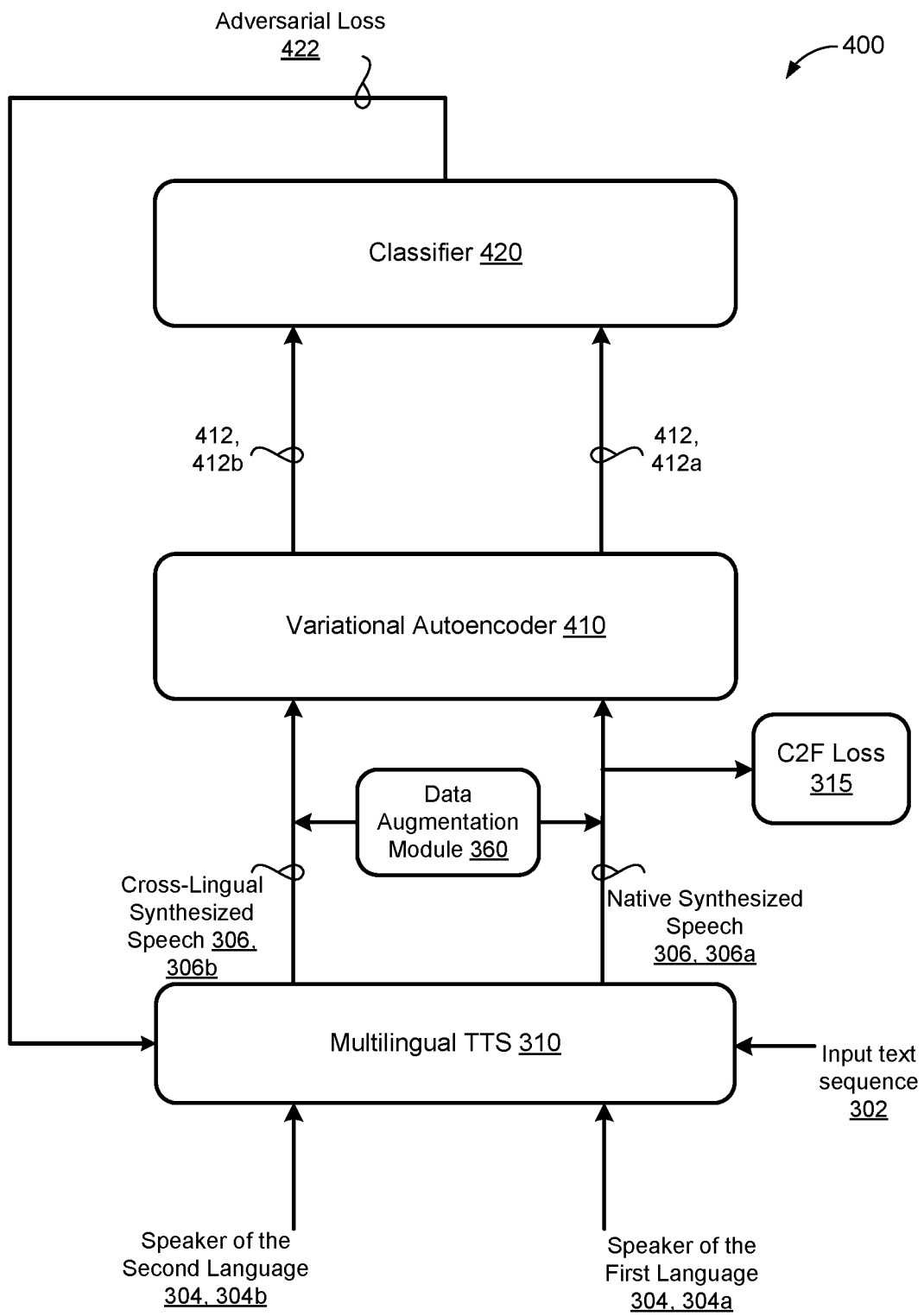
FIG. 4 is a schematic view of an example training process for training a multilingual text-to-speech model

FIG. 4, illustrates an example training process 400 for training the multilingual TTS model 310. In some implementations, the TTS model 310 generates synthesized speech representations 306 that closely correspond to speaker characteristics of a particular speaker. For example, the limited number of native speakers of the first language 304a may result in the TTS model 310 generating native synthesized speech representations 306a that closely resembles the speaker characteristics of the limited number of speakers. As such, the ASR model 200 (FIG. 3) only trains on synthesized speech representations 306 that resemble speaker characteristics for the limited number of speakers. Accordingly, the training process 400 includes a hierarchical variational autoencoder (VAE) 410 that is configured to disentangle the speaker, language, and/or prosody information from the synthesized speech representations 306.

In some examples, the TTS model 310 generates multiple synthesized speech representations 306 for each of the input text sequences 302. Each of the synthesized speech representations 306 may be conditioned on conditioning inputs 304 representing different speakers having different speaker characteristics 304. In some examples, the speakers include speaker characteristics 304 that represent the speaking style for a particular speaker. That is, the speaker characteristics 304 for a particular speaker may include a speaker embedding 305 (FIG. 6), a language embedding 303 (FIG. 6), and/or local embedding 307 (FIG. 6) representing accent/dialect information, discussed in more detail with reference to FIG. 6.

In the example shown, the TTS model 310 receives an input text sequence 302 in a first language. For example, the input text sequence 302 may represent input text in a low resource language of Kannada (i.e., first language). Thereafter, the TTS model 310 generates a native synthesized speech representation 306, 306a for the input text sequence 302 in a first language that is conditioned on the speaker characteristics 304a of the native speaker of the first language 304, 304a. Continuing with the example, the TTS model 310 generates the native synthesized speech representation 306a in Kannada that is conditioned on speaker characteristics 304a of a native speaker of the Kannada language 304a. Thus, the native synthesized speech representation 306a is conditioned on speaker characteristics 304a of a native speaker of the corresponding language of the input text sequence 302.

In some implementations, as described above with respect to the training process 300 of FIG. 3A, the training process 400 of FIG. 4A generates a coarse-to-fine (C2F) loss 315 by comparing the native synthesized speech representation 306a with ground truth audio of the native speaker of the first language for a corresponding input text sequence 302. Thus, the C2F loss 315 represents a difference between non-synthesized speech (e.g., ground truth audio) from the native speaker and the native synthesized speech representation 306a. The training process 400 provides the C2F loss 315 to the TTS model 310 and updates parameters of the TTS model 310 based on the C2F loss 315.

In some implementations, the TTS model 310 also generates a cross-lingual synthesized speech representation 306, 306b for the same input text sequence 302 in the first language conditioned on speaker characteristics 304, 304b of a native speaker of a second language that is different from the first language. That is, the TTS model 310 generates the cross-lingual synthesized speech representation 306b for the input text sequence 302 as the native speaker of the second language would speak it in the first language. For example, the TTS model 310 generates the cross-lingual synthesized speech representation 306b for the same input text sequence 302 in the Kannada language that is conditioned on speaker characteristics 304b of the native speaker of the English language. Put another way, the cross-lingual synthesized speech representation 306b represents Kannada speech spoken as a native speaker of of the English language would speak. Thus, the cross-lingual synthesized speech representation 306b is conditioned speaker characteristics 304b of a native speaker of a different language than the language of the input text sequence 302.

By conditioning the synthesized speech representations 306 on multiple speakers 304, the TTS model 310 can generate multiple synthesized speech representations 306 for each input text sequence 302 in the first language to increase acoustic diversity of the synthesized speech representations 306. That is, the TTS model 310 can utilize one or more speakers from a second language (e.g., English) to synthesize the input text sequence 302 from the first language (e.g., Kannada) even where the speakers of the second language do not speak the first language. Accordingly, the TTS model 310 can leverage high resource language such as English to generate synthesized speech representations for low resource languages to train ASR models. Moreover, the TTS model 310 can generate synthesized speech representations 306 for unspoken input text sequences 302 thereby increasing the lexical diversity of training data for the ASR model 200.

In some implementations the training process 400 generates a spectrogram consistency loss (not shown). That is, the training process may extract latent variables from ground truth audio of the native speaker of the first language to perform teacher forcing on the native speaker of the second language 304b. Thereafter, for a corresponding input text sequence 302, the training process 400 calculates a mean squared error (MSE) between the cross-lingual synthesized speech representation 306b (e.g., based on the teacher forcing) and the ground truth audio of the native speaker of the first language to determine the spectrogram consistency loss. Accordingly, the spectrogram consistency loss promotes consistency between the cross-lingual synthesized speech representations 306b and the ground truth audio of the native speaker of the first language. The spectrogram consistency loss may be provided as feedback to the TTS model 310 to update parameters of the TTS model 310.

In the example shown, the TTS model 310 generates synthesized speech representations 306 conditioned on only two speakers 304a, 304b for the sake of clarity only. That is, the TTS model 310 may generate any number of synthesized speech representations 306 conditioned on speaker characteristics 304 of any number of speakers 304. For example, the TTS model 310 can generate a third synthesized speech representation 306 in the Kannada language that is conditioned on speaker characteristics of a native speaker of a third language (e.g., native speaker of the Spanish language as spoken in Spain). Optionally, the TTS model 310 may generate a fourth synthetics speech representation 306 in the Kannada language conditioned on speaker characteristics of a second native speaker of the first language.

In some implementation, the training process 400 includes a data augmentation module 360 that applies data augmentation to at least one of the native synthesized speech representation 306a and/or the cross-lingual synthesized speech representation 306b. The data augmentation of the synthesized speech representations 306 is configured to further the acoustic diversity of the training samples used to train the ASR model 200. In some examples, the data augmentation module 360 applies data augmentation techniques that include at least one of adding/injecting noise, adding reverberation, or manipulating timing of the synthesized speech representations 306. Another data augmentation technique includes using multistyle training (MTR) to inject a variety of environmental noises to the synthesized speech representations. Yet another data augmentations technique that the data augmentation module 360 may apply in addition to, or in lieu of, MTR, includes using spectrum augmentation (SpecAugment) to make the acoustics of the synthesized speech representations closer. In combination, MTR and SpecAugment may inject noises into the synthesized speech representations 306, tile random external noise sources along time and inserted before and overlapped onto the representation, and filtering the noise-injective synthesized speech representation 306 prior to training the ASR model 200.

The example training process 400 trains the ASR model 200 using the multiple synthesized speech representations 306 generated by the multilingual TTS model 310. In the example shown, the ASR model 200 is trained to recognize speech in the first language (e.g., Kannada language). For each synthesized speech representations 306 the ASR model 200 generates a corresponding speech recognition result 312. The speech recognition result 312 may represent a probability distribution over possible speech recognition hypotheses. The ASR model 200 generates a first speech recognition result 312, 312a for the native synthesized speech representation 306a and a second speech recognition result 312, 312b for the cross-lingual synthesized speech representation 306b. Continuing with the example above, the ASR model 200 receives the mel-frequency spectrogram frames for the native synthesized speech representation 306a conditioned on the first conditioning in put 304a (e.g., speaker characteristics of the native speaker of the Kannada language) and generates the first speech recognition result 312a. The ASR model also receives the mel-frequency spectrogram frames for the cross-lingual synthesized speech representation 306b conditioned on the second conditioning input 304b (e.g., speaker characteristics of the native speaker of the English language) and generates the second speech recognition result 312b.

The training process 400 also includes the hierarchical VAE (interchangeably referred to as VAE) 410 configured to generate encoder embeddings 412 for the synthesized speech representations 306. The VAE 410 includes a local encoder configured to encode fixed two-second chunks of each synthesized speech representation 306 with a one second overlap and a global encoder configured to encode the entire synthesized speech representation 306. In the example shown, the VAE 410 receives the native synthesized speech representation 306a and generates a native audio encoder embedding 412, 412a. The native audio encoder embedding 412a represents latent variables extracted from the native synthesized speech representation 306a. For example, the native audio encoder embedding 412 may represent prosody/accent information extracted from the native synthesized speech representation 306a. Moreover, the VAE 410 generates a cross-lingual audio encoder embedding 412, 412b for the cross-lingual synthesized speech representation 306b. The cross-lingual audio encoder embedding 412b represents latent variables (e.g., prosody/accent information) extracted from the cross-lingual synthesized speech representation 306b.

The training process 400 also executes a classifier 420 that receives the native audio encoder embedding 412a and the cross-lingual audio encoder embedding 412b. The classifier 420 may be a language classifier. The classifier 420 determines an adversarial loss term 422 based on the native audio encoder embedding 412a and the cross-lingual audio encoder embedding 412b. The TTS model 310 receives the adversarial loss term 422 from the classifier 420 and updates parameters of the TTS model 310 based on the adversarial loss term 422. That is, the adversarial loss term 422 discourages the TTS model 310 from generating synthesized speech representations 306 that only resembles the prosody/accent information of the speakers 304. Put another way, the encoder embeddings 412 extracted from the synthesized speech representations 306 using the VAE 410 are disentangled from speaker information by applying the adversarial loss term 422 on speaker classification.

Figure 5:
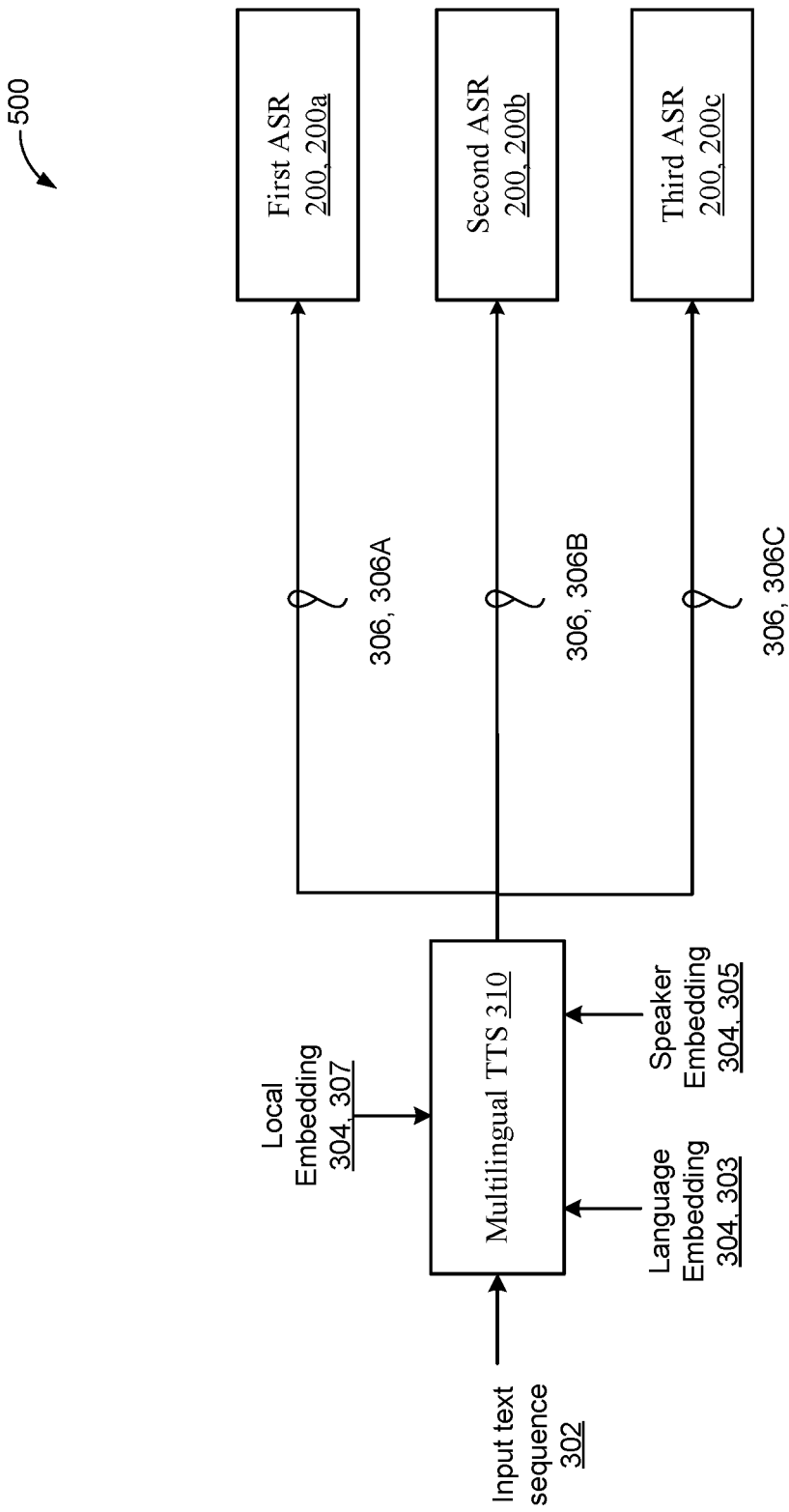
FIG. 5 is a schematic view of a multilingual text-to-speech model training multiple speech recognition models.

Referring now to FIG. 5, in some implementations, the TTS model 310 generates synthesized speech representations 306 in different languages to train multiple monolingual ASR models 200 separately. In the example shown, a first ASR model 200, 200a is trained on synthesized speech representations 306, 306A generated by the TTS model 310 in a first language to recognize speech in the first language, a second ASR model 200, 200b is trained on synthesized speech representations 306, 306B generated by the TTS model 310 in a second language to recognize speech in the second language, and a third ASR model 200, 200c is trained on synthesized speech representations 306, 306C generated by the TTS model 310 in a third language to recognize speech in the third language. In other examples, the TTS model 310 generates synthesized speech representations 306 in multiple languages to train a single multilingual ASR model 200 to recognize speech in the multiple different languages. As such, the multilingual TTS model 310 generates the synthesized speech representations from input text sequences in multiple different languages for use as training audio data for training one or more monolingual ASR models 200 and/or a multilingual ASR model 200. The synthesized speech representations in each language may include both native synthesized speech representations 306a in the respective language that are conditioned on speaker characteristics 304a of native speakers of the respective language and/or cross-lingual speech representations 306b (FIG. 3) in the respective language that are conditioned on speaker characteristics 304b of native speakers of a different language. While the example shown depicts the ASR models 200 being trained on synthesized speech representations, which may include mel-frequency spectrograms, the ASR models 200 may similarly be trained on time-domain audio waveforms of synthesized speech converted from the synthesized speech representations, e.g., via a vocoder (not shown) or other synthesizer device (not shown).

In the example shown, the TTS model 310 receives, as input, an input text sequence 302 and one or more conditioning inputs 304 and generates, as output, the synthesized speech representation 306 in a respective language to train the ASR model 200 in the respective language. Here, the conditioning inputs 304 received by the TTS model 310 for conditioning the synthesized speech representation 306 generated from the input text sequence 302 in the respective language may include at least one of a language embedding 303 associated with the respective language, a speaker embedding 305 specifying voice characteristics of a respective speaker, or a local embedding 307 specifying accent/dialect information. As such, the resulting synthesized speech representation 306 may convey a speaking style having an accent/dialect specified by the local embedding and in a voice of the target speaker specified by the speaker embedding 305.

Figure 6:
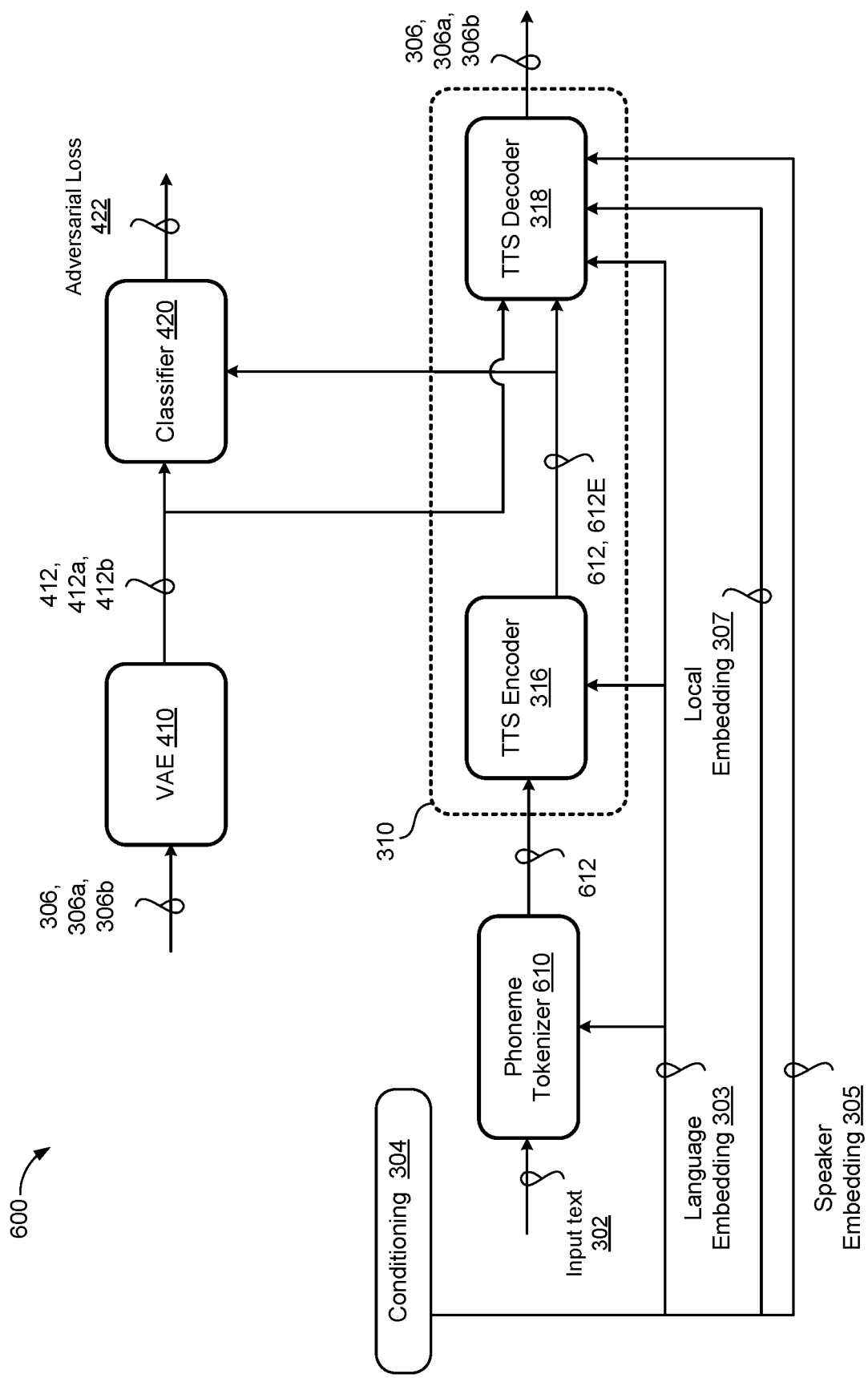
FIG. 6 is a schematic view of an example speech recognition system

FIG. 6 shows a schematic view of an example speech recognition system 600. Here, the TTS model 310 generates synthetized speech representations 306 each conditioned on speaker characteristics 304 of a respective speaker for a corresponding input text sequence 302. The speaker characteristics 304 may include a language embedding 303, a speaker embedding 305, and/or a local embedding 307. That is, the language embedding 303 may specify language information associated with the language of the synthesized speech representation 306 to be produced, the speaker embedding 305 may represent voice characteristics of a target speaker, and the local embedding 307 may specify accent/dialects associated with the synthesized speech representation 306 to be produced.

A phoneme tokenizer 610 receives the input text sequence 302 and transliterates the language of the text sequence 302 into a native script. In some implementations, the phoneme tokenizer 610 transliterates the language of the text sequence 302 into the native script based on the language embedding 303. The phoneme tokenizer 610 tokenizes the native script into a phoneme sequence 612. All languages of the phoneme tokenizer 610 share a global Speech Assessment Methods Phonetic Alphabet (SAMPA) derived phoneme set. The phoneme tokenizer 610 provides the phoneme sequence 612 corresponding to the input text sequence 302 as input to the TTS model 310.

The TTS model 310 includes an encoder portion 316 that shares the language embeddings (i.e., language identifiers) 303 across the first and second languages. The language embeddings 303 may be input to the encoder portion 316 to improve phoneme embedding extraction. Here, the language embeddings may be trained jointly with the TTS model 310. The TTS model 310 also includes a decoder portion 318 that shares the language embeddings 303 across the first and second languages and shares speaker embedding 305 for different speakers. The decoder portion 318 may also share the local embeddings 307.

The encoder portion 316 is configured to encode the phoneme sequence 612 to generate an encoded phoneme sequence 612, 612E. In some implementations, the encoder portion 316 includes an attention network that is configured to receive the phoneme sequence 612 to generate the corresponding encoded phoneme sequence 612E as a fixed-length context vector for each output step of the decoder portion 318. That is, the attention network at the encoder portion 316 may generate a fixed length vector for each frame of a mel-frequency spectrogram (e.g., synthesized speech representation 306) that the decoder portion 318 will later generate. The attention network may determine a weight for each element of the encoder portion 316 output and generate the fixed length vector by determining a weighted sum of each element. The attention weights may change for each decoder portion 318 time step.

Accordingly, the decoder portion 318 is configured to receive, as input, the encoded phoneme sequence 317 from the encoder portion 316, the speaker embedding 305, and the language embedding 303 (and optionally the local embedding 317) to generate the synthesized speech representations 306. In some examples, the decoder portion 318 is further conditioned on prosody information (i.e., encoder embeddings 412) extracted from the synthesized speech representations 306. The synthesized speech representation 306 is in the language specified by the language embedding 303 and represents the voice of the target speaker specified by the speaker embedding 303 (e.g., who may be a native speaker of the first language 304a or a native speaker of the second language 304b).

The decoder portion 318 decodes the encoded phoneme sequence 312E to generate the respective one of the native synthesized speech representation 306a or the cross-lingual synthesized speech representation 306b. For example, where the decoder portion 318 receives a language embedding 303 for the first language and a speaker embedding 305 for a native speaker of the first language 304a, the decoder portion 318 decodes the encoded phoneme sequence 612E and generates a native synthesized speech representation 306a. In an alternative example, where the decoder portion 318 receives the language embedding 303 for the first language and a speaker embedding 305 for a native speaker of a second language 304b, the decoder portion 318 decodes the encoded phoneme sequence 612E and generates a cross-lingual synthesized speech representation 306b.

In the example shown, the TTS model 310 provides the synthesized speech representations 306 as input to the VAE 410. The VAE 410 is configured to consume the synthesized speech representations 306 and output a respective one of the native audio encoder embedding 412a or the cross-lingual audio encoder embedding 412b. That is, the VAE 410 extracts latent variables (e.g., prosody information) from the synthesized speech representations 306. For example, where the VAE 410 receives the native synthesized speech representation 306a, the VAE 410 extracts the latent variables of the native synthesized speech representations 306a and generates the native audio encoder embedding 412a. Alternatively, where the VAE 410 receives the cross-lingual synthesized speech representation 306b, the VAE 410 extracts the latent variables of the cross-lingual synthesized speech representation 306b and generates the cross-lingual audio encoder embedding 412b. In some implementations, the decoder portion 318 is further conditioned on the prosody information extracted by the VAE 410 from the synthesized speech representations 306. That is, the decoder portion 318 receives the audio encoder embeddings 412 and further conditions the synthesized speech representations 306 based on the audio encoder embeddings 412. The adversarial loss 422 may be applied on the encoded phone sequence 612E to disentangle prosody from speaker information.

The classifier 420 receives the audio encoder embeddings 412 and generates the adversarial loss 422. In some examples, the classifier 420 includes a language classifier. In other examples, the classifier 420 includes an adversarial or speaker classifier. The classifier 420 may be configured to disentangle the prosody information extracted from the synthesized speech representations 306 by applying the adversarial loss on speaker classifications. The TTS model 310 may receive the adversarial loss 422 and update parameters based on the adversarial loss 422.

Figure 7:
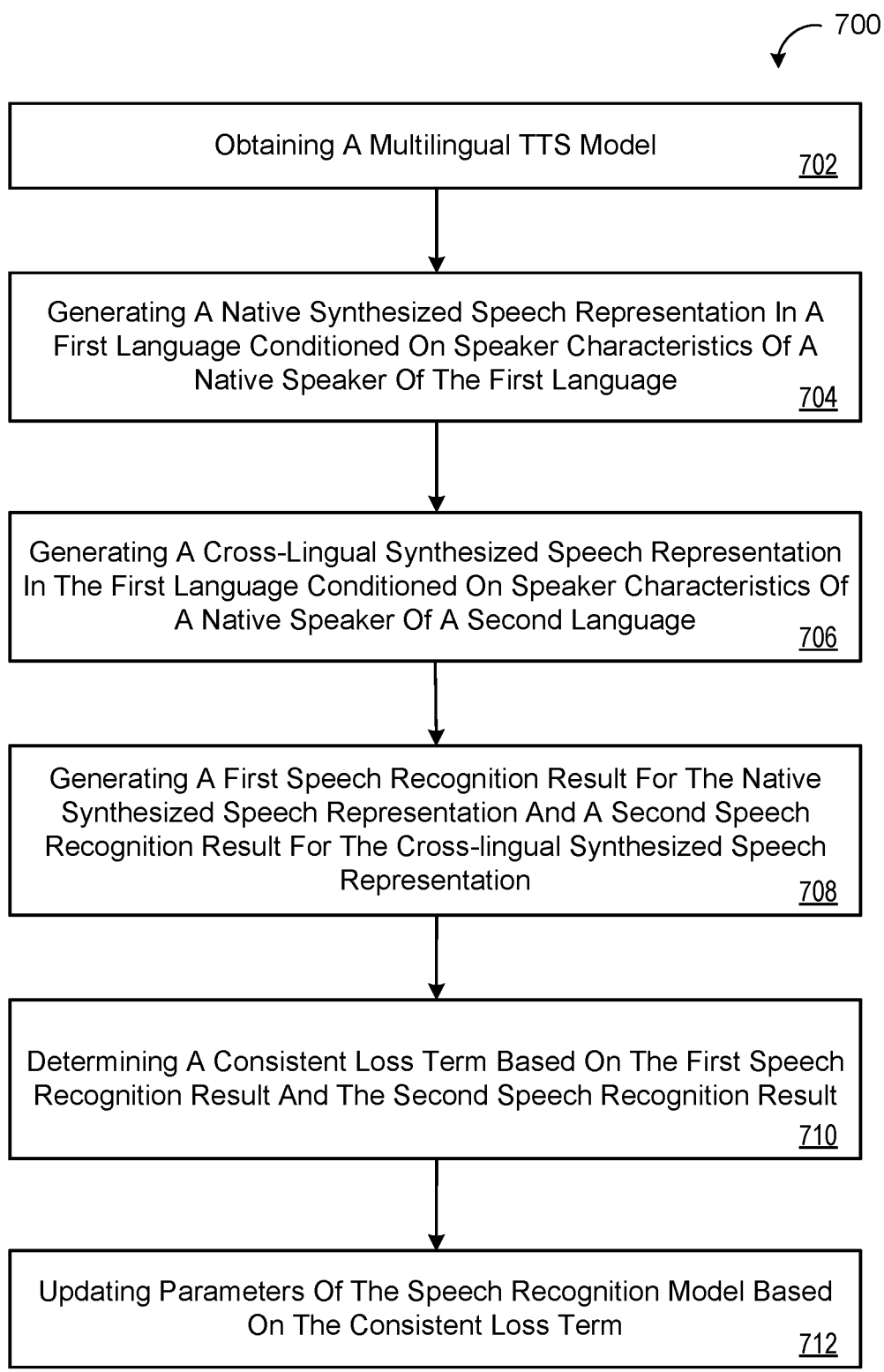
FIG. 7 is a flowchart of an example arrangement of operations for a method of training an automated speech recognition model.

FIG. 7 is a flowchart of an exemplary arrangement of operations for a computer-implemented method 700 for training an automated speech recognition (ASR) model 200. At operations 702, the method 700 includes obtaining a multilingual text-to-speech (TTS) model 310. At operation 704, the method 700 includes generating, using the multilingual TTS model 310, a native synthesized speech representation 306, 306a for an input text sequence 302 in a first language that is conditioned on speaker characteristics 304a of a native speaker of the first language. Here, the first language may be Kannada which is a low resource language that only has a few native speakers with constrained speaking styles. At operation 706, the method 700 includes generating, using the TTS model 310, a cross-lingual synthesized speech representation 306, 306b for the input text sequence 302 in the first language that is conditioned on speaker characteristics 304b of a native speaker of a different second language. The second language may be English that has thousands of native speakers 304b with a variety of speaking styles.

At operation 708, the method 700 includes generating, using the ASR model 200, a first speech recognition result 312, 312a for the native synthesized speech representation 306a and a second speech recognition result 312, 312b for the cross-lingual synthesized speech representation 306b. At operation 710, the method 700 includes determining a consistent loss term 352 based on the first speech recognition result 312a and the second speech recognition result 312b. At operation 712, the method 700 includes updating parameters of the ASR model 200 based on the consistent loss term 352. Optionally, the parameters of the ASR model 200 may be fixed while the consistent loss term 352 is back-propagated through the TTS model 310 for updating parameters of the TTS model 310 based on the consistent loss term 352.

Figure 8:
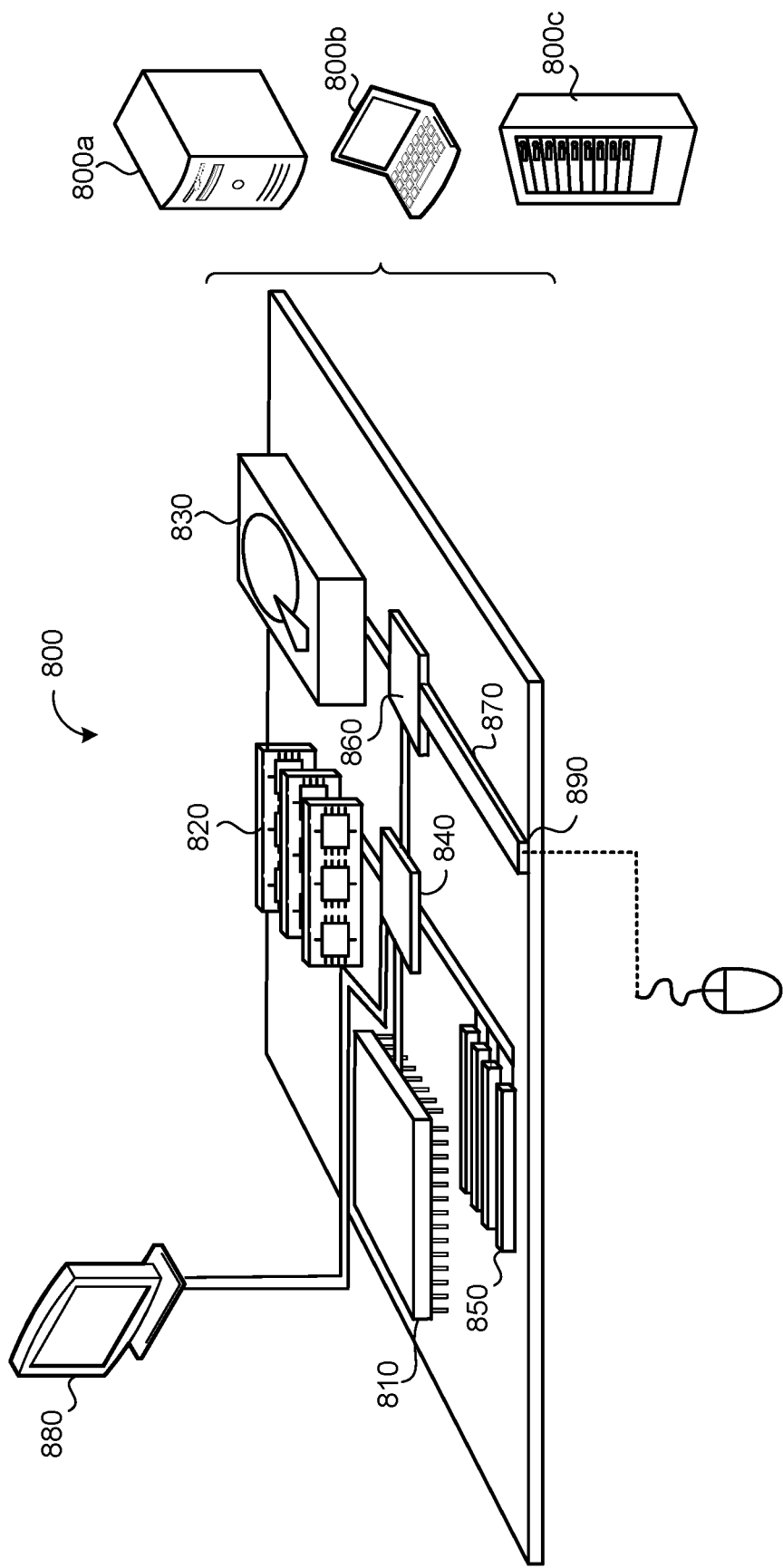
FIG. 8 is a schematic view of an example computing device that may be used to implement the systems and methods described herein.

FIG. 8 is schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed on data processing hardware that causes the data processing hardware to perform operations, the operations comprising:
    obtaining a multilingual text-to-speech (TTS) model comprising:
        an encoder portion that shares language embeddings across the first and second languages; and
        a decoder portion that shares the language embeddings across the first and second languages and shares speaker embeddings for both native speakers of the first language and native speakers of the second language, wherein a number of speaker embeddings for the native speakers of the first language is less than a number of speaker embeddings for the native speakers of the second language;
    generating, using the multilingual TTS model, a native synthesized speech representation for an input text sequence in a first language, the native synthesized speech representation conditioned on speaker characteristics of a native speaker of the first language;
    generating, using the multilingual TTS model, a cross-lingual synthesized speech representation for the input text sequence in the first language, the cross-lingual synthesized speech representation conditioned on speaker characteristics of a native speaker of a different second language;
    generating, using a speech recognition model, a first speech recognition result for the native synthesized speech representation, the speech recognition model comprising a neural network trained to generate transcriptions of audio data;
    generating, using the speech recognition model, a second speech recognition result for the cross-lingual synthesized speech representation;
    determining a consistent loss term based on the first speech recognition result and the second speech recognition result; and
    updating, using machine learning, parameters of the speech recognition model based on the consistent loss term.

2. The computer-implemented method of claim 1, wherein the operations further comprise:

generating a first cross-entropy loss term based on the first speech recognition result and the input text sequence in the first language;
determining a second cross-entropy loss term based on the second speech recognition result and the input text sequence in the first language; and
updating parameters of the speech recognition model based on the first and second cross-entropy loss terms.

3. The computer-implemented method of claim 2, wherein the parameters of the speech recognition model are updated based on the consistent loss term independently of the first and second cross-entropy loss terms.

4. The computer-implemented method of claim 2, wherein the operations further comprise back-propagating the first and second cross-entropy losses through the multilingual TTS model.

5. The computer-implemented method of claim 1, wherein the operations further comprise applying data augmentation to at least one of the native synthesized speech representation or the cross-lingual synthesized speech representation.

6. The computer-implemented method of claim 1, wherein the decoder portion of the multilingual TTS model is further conditioned on prosody information extracted from synthesized speech representations using a variational autoencoder.

7. The computer-implemented method of claim 6, wherein the prosody information extracted from the synthesized speech representations using the variational autoencoder is disentangled from speaker information by applying an adversarial loss on speaker classification.

8. The computer-implemented method of claim 1, wherein the operations further comprise, prior to generating the native and cross-lingual synthesized speech representations:
transliterating the input text sequence in the first language into a native script;
tokenizing the native script into a phoneme sequence;
encoding, using an encoder of the multilingual TTS model, the phoneme sequence; and
decoding, using a decoder of the multilingual TTS model, the encoded phoneme sequence to generate the respective one of the native synthesized speech representation or the cross-lingual synthesized speech representation.

9. The computer-implemented method of claim 1, wherein the operations further comprise:
generating, using a variational autoencoder, a native audio encoder embedding for the native synthesized speech representation;
generating, using the variational autoencoder, a cross-lingual audio encoder embedding for the cross-lingual synthesized speech representation;
determining an adversarial loss term conditioned on the first language based on the native and cross-lingual audio encoder embeddings; and
updating parameters of the multilingual TTS model based on the adversarial loss term.

10. A system comprising:
data processing hardware; and
memory hardware in communication with the data processing hardware, the memory hardware storing instructions that, when executed on the data processing hardware, cause the data processing hardware to perform operations comprising:
obtaining a multilingual text-to-speech (TTS) model comprising:
an encoder portion that shares language embeddings across the first and second languages; and
a decoder portion that shares the language embeddings across the first and second languages and shares speaker embeddings for both native speakers of the first language and native speakers of the second language, wherein a number of speaker embeddings for the native speakers of the first language is less than a number of speaker embeddings for the native speakers of the second language;
generating, using the multilingual TTS model, a native synthesized speech representation for an input text sequence in a first language, the native synthesized speech representation conditioned on speaker characteristics of a native speaker of the first language;
generating, using the multilingual TTS model, a cross-lingual synthesized speech representation for the input text sequence in the first language, the cross-lingual synthesized speech representation conditioned on speaker characteristics of a native speaker of a different second language;
generating, using a speech recognition model, a first speech recognition result for the native synthesized speech representation, the speech recognition model comprising a neural network trained to generate transcriptions of audio data;
generating, using the speech recognition model, a second speech recognition result for the cross-lingual synthesized speech representation;
determining a consistent loss term based on the first speech recognition result and the second speech recognition result; and
updating, using machine learning, parameters of the speech recognition model based on the consistent loss term.

11. The system of claim 10, wherein the operations further comprise:
generating a first cross-entropy loss term based on the first speech recognition result and the input text sequence in the first language;
determining a second cross-entropy loss term based on the second speech recognition result and the input text sequence in the first language; and
updating parameters of the speech recognition model based on the first and second cross-entropy loss terms.

12. The system of claim 11, wherein the parameters of the speech recognition model are updated based on the consistent loss term independently of the first and second cross-entropy loss terms.

13. The system of claim 11, wherein the operations further comprise back-propagating the first and second cross-entropy losses through the multilingual TTS model.

14. The system of claim 10, wherein the operations further comprise applying data augmentation to at least one of the native synthesized speech representation or the cross-lingual synthesized speech representation.

15. The system of claim 10, wherein the decoder portion of the multilingual TTS model is further conditioned on prosody information extracted from synthesized speech representations using a variational autoencoder.

16. The system of claim 15, wherein the prosody information extracted from the synthesized speech representations using the variational autoencoder is disentangled from speaker information by applying an adversarial loss on speaker classification.

17. The system of claim 10, wherein the operations further comprise, prior to generating the native and cross-lingual synthesized speech representations:
- transliterating the input text sequence in the first language into a native script;
- tokenizing the native script into a phoneme sequence;
- encoding, using an encoder of the multilingual TTS model, the phoneme sequence; and
- decoding, using a decoder of the multilingual TTS model, the encoded phoneme sequence to generate the respective one of the native synthesized speech representation or the cross-lingual synthesized speech representation.

18. The system of claim 10, wherein the operations further comprise:
- generating, using a variational autoencoder, a native audio encoder embedding for the native synthesized speech representation;
- generating, using the variational autoencoder, a cross-lingual audio encoder embedding for the cross-lingual synthesized speech representation;
- determining an adversarial loss term conditioned on the first language based on the native and cross-lingual audio encoder embeddings; and
- updating parameters of the multilingual TTS model based on the adversarial loss term.

19. The computer-implemented method of claim 1, wherein the consistent loss term comprises a Kullback-Leibler divergence between:
- a first probability distribution over first speech recognition hypotheses for the native synthesized speech representation; and
- a second probability distribution over second speech recognition hypotheses for the cross-lingual synthesized speech representation.

20. The system of claim 10, wherein the consistent loss term comprises a Kullback-Leibler divergence between:
- a first probability distribution over first speech recognition hypotheses for the native synthesized speech representation; and
- a second probability distribution over second speech recognition hypotheses for the cross-lingual synthesized speech representation.

* * * * *